Figure 1:
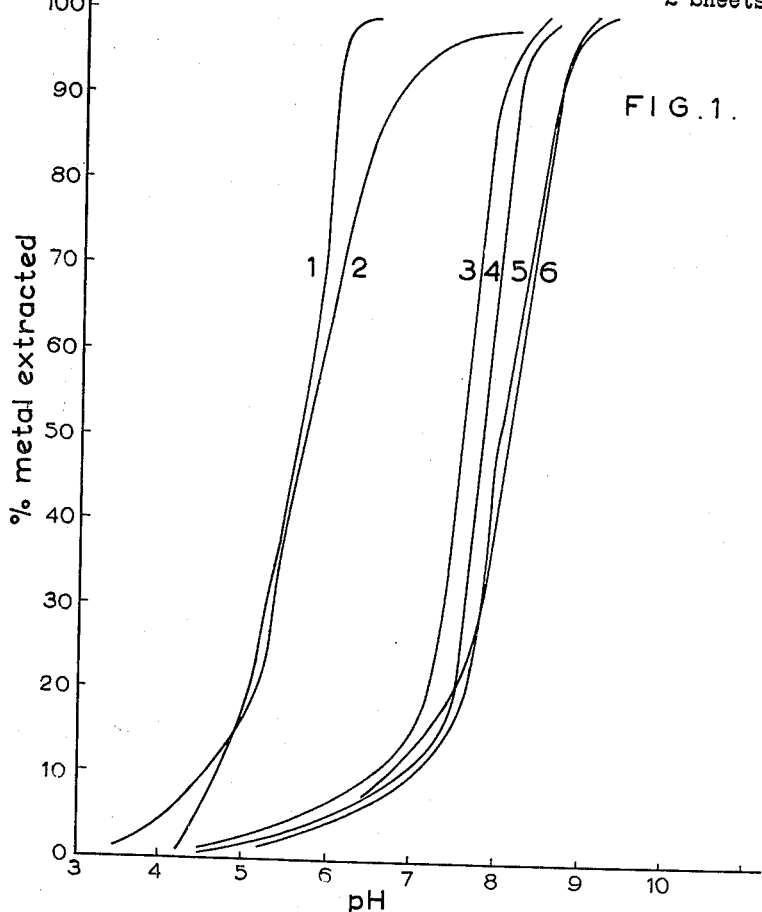

The effect of pH on the extraction of Cu, Ni and Co from sulphate solutions 1. 0·1M CuSO$_4$ + 120g/litre (NH$_4$)$_2$SO$_4$
2. 0·1M CuSO$_4$
3. 0·1M NiSO$_4$ + 30g/litre (NH$_4$)$_2$SO$_4$
4. 0·1M CoSO$_4$ + 30g/litre (NH$_4$)$_2$SO$_4$
5. 0·1M NiSO$_4$
6. 0·1M CoSO$_4$

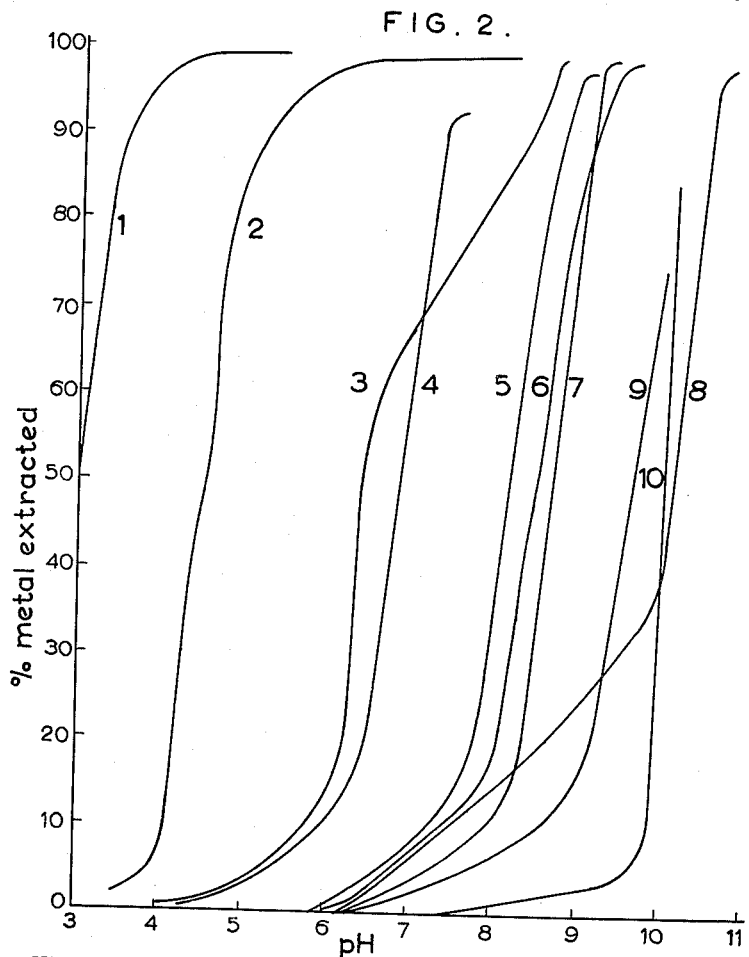

3,055,754
EXTRACTION OF METAL VALUES
Archibald William Fletcher, Stevenage, England, assignor to National Research Development Corporation, London, England, a British corporation
Filed June 24, 1960, Ser. No. 38,617
Claims priority, application Great Britain June 29, 1959
6 Claims. (Cl. 75—97)

This invention is concerned with improvements in or relating to the extraction of metal values from aqueous media containing such values in solution.

The invention provides a process for extracting metal values from an aqueous medium containing at least one metal value in solution or suspension, which comprises contacting said aqueous medium with a solution of naphthenic acid in an inert solvent which is substantially immiscible with the aqueous medium.

The term "metal values" as used herein refers to compounds of metals other than the alkali metals.

Preferably the aqueous medium is at a pH which is not more than 0.5 of a pH unit below the pH of hydrolysis, i.e. the pH of incipient precipitation of the metal value which it is desired to extract.

According to a preferred embodiment of the invention a process is provided for extracting a metal value from an aqueous medium containing at least two metal values in solution which comprises contacting said aqueous medium at a pH at or above the pH of hydrolysis of the desired metal value but below the pH of hydrolysis of the undesired metal value or metal values with a solution of naphthenic acid in an inert solvent which is substantially immiscible with the aqueous medium.

Naphthenic acids are essentially carboxylic derivatives of cycloparaffin hydrocarbons and are of variable composition, the acid value of the refined naphthenic acid generally ranging from 170 to about 340, the precise structure of the derivative varying with the source of the crude petroleum from which they are obtained during refining. These naphthenic acids form metallic soaps (naphthenates) which have many industrial uses.

Examples of solvents which may be used are liquid aromatic hydrocarbons such as benzene, toluene or xylene, or mixtures of aliphatic hydrocarbons containing up to 10% of aromatic hydrocarbons such as white spirit and kerosene. Kerosene is the preferred solvent.

It has been found that the naphthenic acid solutions will extract certain metal values from an aqueous solution, depending on the pH of the latter, the metals being extracted as naphthenates which are insoluble in water but very soluble in organic solvents such as kerosene.

The particular metals which are extracted from an aqueous solution depends largely on the pH of such solution. Thus the alkaline earth metal naphthenates are not extracted from acidic solutions while copper naphthenate is readily extracted at pH 6, and nickel naphthenate at pH 8.

The metal values can be readily stripped from the loaded extraction solvent containing the metal naphthenates by contacting it with dilute mineral acid, for example dilute sulphuric acid. In this operation, free naphthenic acid is reformed and, since it remains in the solvent, it can be re-used for extracting fresh aqueous solution while the metal values dissolve in the dilute aqueous acid solution, for example as the corresponding sulphates when sulphuric acid is used.

Furthermore, the loaded extraction solvent can be stripped selectively by extraction with aqueous acid solutions of suitable pH and the resulting aqueous extracts can themselves be stripped with further naphthenic acid solutions. Repetition of these procedures can be used to give a relative enrichment of one or more of the original metal values.

This process can be operated by the normal techniques used in co-current or counter-current liquid-liquid extraction, the final product being a concentrated solution of the metal value in a relatively purified form.

The raffinate from the process can be subjected to further extraction in accordance with the process of the invention, for example at a different pH, to extract further or residual metal values.

The invention is most conveniently put into practice by obtaining a solution of the naphthenate of one desired metal in the inert solvent in the substantial absence of other metals and stripping this solution by contacting it with an aqueous solution of an acid. To obtain a solution of the desired metal naphthenate, other metal ions the salts of which in the aqueous solution have pH of hydrolysis less than that of the desired metal are first removed by adjusting the pH of the aqueous solution to a value less than that of the pH of hydrolysis of the said desired metal and contacting the solution with a solution of naphthenic acid in an inert solvent whereby to remove said other metals. The aqueous raffinate contains the salt of the desired metal. The pH of the raffinate is now brought to a pH value substantially equal to the pH of hydrolysis of the salt of the desired metal and contacted with a solution of naphthenic acid in the inert solvent. The resulting solution of the metal naphthenate is then stripped by contacting the solution with an aqueous solution of an acid.

Alternatively, all the metal ions present may first be extracted from their aqueous solution into the naphthenic acid solution and the resultant solutions of naphthenates selectively stripped by contacting it successively with aqueous solutions of acid at suitable pH values.

Whichever method of extraction is employed, it will be understood that the degree of separation of individual metals which can be obtained depends upon the differences in the values of the pH of hydrolysis of the various metal salts. Where the difference is large, for instance in the case of copper and nickel salts, good separations can be effected. Where it is small, for instance in the case of cobalt, nickel and ferrous iron, the degree of separation from each other which can be effected is slight. To effect a higher degree of separation of these metals other methods known to those skilled in the art can be applied to the enriched extract. Satisfactory separation of copper from cobalt, nickel, zinc, manganese, calcium and ferrous ions; of zinc from cobalt, nickel, manganese and calcium can be effected. Only partial separation of ferrous iron from manganese and calcium; of cobalt from manganese and calcium and of nickel from manganese and calcium can be effected in a single stage.

Particular advantages of the process of the present invention arise from the following facts:

(a) Naphthenates of a wide range of metals, and particularly those of copper, nickel, cobalt, iron, zinc and manganese, are readily formed in the process.

(b) Naphthenic acids are abundant, and cheaper than other reagents commonly employed in comparable processes.

(c) Naphthenic acids are highly insoluble in water, so that solvent losses are negligible.

(d) The metal naphthenates are sufficiently different in their chemical behaviour to enable separations to be made.

(e) Naphthenic acids are stable and are therefore suitable for use in a continuous liquid-liquid extraction process in which the acid is regenerated.

The following examples illustrate the process of the invention:

Example I

A leach solution containing 2.54 grams per litre of copper (M/25) at a pH of 6 and flowing at 25 imperial gallons per hour was contacted with an approximately molar solution of naphthenic acid in kerosene flowing at 5 imperial gallons per hour. The loaded solvent containing copper at the naphthenate was then stripped with a molar solution of sulphuric acid flowing at 1 imperial gallon per hour. This gives a concentrated aqueous solution containing 63.5 grams per litre of copper while the freed naphthenic acid was recycled.

Example II

An aqueous solution containing 0.1 M copper sulphate, 0.1 M $FeSO_4$ and 0.4 M sodium acetate was extracted while at pH 5.3 with one half its volume of a 1 M solution of naphthenic acid in kerosene. Of the copper, 76% was extracted and of the iron 9.0% was extracted.

The raffinate was then extracted with a further ½ volume of 1 M naphthenic acid in kerosene, bringing the total copper extracted to 93.5%, the total iron extracted remaining at 9.0%.

Repeated extraction of the raffinate with another ½ volume of 1 M naphthenic acid in kerosene brought the total copper extracted to 94.0%, with no change in the total iron extracted.

Example III

The procedure in this case was the same as in Example II save that the aqueous solution treated comprised 0.1 M copper sulphate, 0.1 M cobalt sulphate and 0.4 M sodium acetate, the pH of the solution being 5.4. The results in this case were as follows:

|  | Total Values Extracted, Percent | |
|---|---|---|
|  | Copper | Cobalt |
| After 1st extraction | 93.5 | 4 |
| After 2nd extraction | 95.5 | 4.5 |
| After 3rd extraction | 98.0 | 5 |

Example IV

Copper and nickel were recovered from an aqueous solution of metal sulphates having a pH of 1.5 and containing 17.6 gm./litre of nickel, 19.1 gm./litre of copper, 1.0 gm./litre of zinc, 1.0 gm./litre of cobalt and 4.0 gm./litre of ferric iron as follows:

(i) *Iron removal.*—200 mls. of solution were taken, heated to about 80° C., a small amount of potassium chlorate added and the pH of the solution increased to 3.0 by the addition of ammonia. The solution was allowed to stand for about 1 hour and then filtered. The filtrate was set aside for the next stage in the process and the precipitate was dissolved in dilute hydrochloric acid and sent for analysis.

(ii) *Copper recovery.*—The pH of the filtrate was raised to 6.0 by the addition of ammonia and was extracted twice with 70 mls. of M naphthenic acid in kerosene and once with 45 mls. of the same reagent. The loaded solvents were combined and stripped with 2 N sulphuric acid to give a copper solution.

(iii) *Nickel recovery.*—Ammonia was added to the raffinate from (ii) till the pH was 8.0 and the solution was once again extracted three times with M naphthenic acid in kerosene. The loaded solvents were combined and stripped with 2 N sulphuric acid to give a nickel solution.

The distribution of the metal values calculated from the analytical results obtained is given in the following table:

| Product | Copper, percent | Nickel, percent | Iron, percent | Cobalt, percent | Zinc, percent |
|---|---|---|---|---|---|
| Iron precipitate | 7.6 | 6.8 | 97.6 | 6.0 | 6.7 |
| Copper Strip | 88.2 | 1.9 | 0.3 | 7.0 | 0.8 |
| Nickel Strip | 4.2 | 90.4 | 2.1 | 86.4 | 92.5 |
| Raffinate | 0 | 0.9 | 0 | 0.6 | 0 |
| Total | 100.0 | 100.0 | 100.0 | 100.0 | 100.0 |

Example V

Cobalt and copper were separated in a laboratory-scale continuous counter-current extraction apparatus. The two phases were contacted in stages, in four 40 ml. mixing cells. The settling cells between each stage had a volume of 50 mls. The aqueous solution containing 0.1 M copper and 0.1 M cobalt at a pH of about 6.0 and flowing at about 500 mls./hour was contacted with 1 M naphthenic acid in kerosene flowing at 250 mls./hour. In this operation the copper was transferred to the organic layer while the cobalt passed out of the system. Stripping of the loaded solvent was carried out in a similar mixer-settler apparatus with 2 N sulphuric acid flowing at 100 mls./hour. The concentration of copper achieved in the process was in the ratio 5:1.

The effect of pH on the degree of extraction of various metal values is further illustrated by the graphs constituting the two figures of the accompanying drawings. In the graphs the percentage of various metal values extracted is plotted against pH in the case of the extraction with an equal volume of 1 M naphthenic acid in kerosene of solutions comprising 0.1 M of the respective metal sulphates (or the chloride in the case of calcium), the pH of the solutions being adjusted by the addition of aqueous ammonia. With sulphate solutions of metals the precipitation of the corresponding hydroxides at high pH values can be prevented by adding ammonium sulphate.

I claim:

1. A process for extracting metal values selected from the group consisting of bivalent metal values, ferric iron values and aluminum values from an aqueous medium containing at least one metal value selected from the group consisting of bivalent metal values, ferric iron values and aluminum values, which comprises contacting said aqueous medium with a solution of naphthenic acid in an inert solvent which is substantially immiscible with the aqueous medium, said aqueous medium being at a pH which is not more than 0.5 of a pH unit below the pH of hydrolysis of the metal value which it is desired to extract.

2. A process as claimed in claim 1, wherein the inert solvent for the naphthenic acid is a liquid aromatic hydrocarbon.

3. A process as claimed in claim 1, wherein the inert solvent for the naphthenic acid is a mixture of aliphatic and aromatic hydrocarbons containing up to 10% by weight of aromatic hydrocarbons.

4. A process as claimed in claim 1, wherein the inert solvent for the naphthenic acid is kerosene.

5. A process for extracting a metal value selected from the group consisting of bivalent metal values, ferric iron values and aluminum values from an aqueous medium containing at least two metal values, selected from the group consisting of bivalent metal values, ferric iron values and aluminum values, which comprises contacting said aqueous medium at a pH which is at least as high as the pH of hydrolysis of the desired metal value but below the pH of hydrolysis of the undesired metal value or metal values with a solution of naphthenic acid in an inert solvent which is substantially immiscible with the aqueous medium.

6. A process for extracting metal values selected from the group consisting of bivalent metal values, ferric iron values and aluminum values from an aqueous medium containing at least one metal value selected from the group consisting of bivalent metal values, ferric iron values and aluminum values, which comprises contacting said aqueous medium with a solution of naphthenic acid in an inert solvent which is substantially immiscible with the aqueous medium, said aqueous medium being at a pH which is not more than 0.5 of a pH unit below the pH of hydrolysis of the metal value which it is desired to extract, and removing at least one metal value from the solution in the inert solvent by contacting it with an aqueous acid solution.

References Cited in the file of this patent

UNITED STATES PATENTS

| | | |
|---|---|---|
| 2,187,750 | Marvin | Jan. 23, 1940 |
| 2,561,862 | Hill | July 24, 1951 |
| 2,847,275 | Yeager | Aug. 12, 1958 |